United States Patent
Issac et al.

(10) Patent No.: US 11,804,801 B2
(45) Date of Patent: Oct. 31, 2023

(54) THREE PHASE AC MOTOR DRIVE

(71) Applicant: AMETEK ROTRON, Woodstock, NY (US)

(72) Inventors: Basil Issac, Bangalore (IN); Leslie W. Yoho, Woodstock, NY (US); David D. Heberle, Woodstock, NY (US); Arthur Tong, Woodstock, NY (US)

(73) Assignee: AMETEK ROTRON, Woodstock, NY (US)

( * ) Notice: Subject to any disclaimer, the term of this patent is extended or adjusted under 35 U.S.C. 154(b) by 0 days.

(21) Appl. No.: 17/534,260

(22) Filed: Nov. 23, 2021

(65) Prior Publication Data

US 2023/0170836 A1  Jun. 1, 2023

(51) Int. Cl.
*H02P 27/08* (2006.01)
*H02P 29/50* (2016.01)

(52) U.S. Cl.
CPC .......... *H02P 29/50* (2016.02); *H02P 27/085* (2013.01); *H02P 2207/01* (2013.01)

(58) Field of Classification Search
CPC ..... H02P 29/50; H02P 27/085; H02P 2207/01
See application file for complete search history.

(56) References Cited

U.S. PATENT DOCUMENTS

| | | | | |
|---|---|---|---|---|
| 5,969,498 A * | 10/1999 | Cooke | ..................... | H02P 27/08 318/807 |
| 7,468,595 B2 * | 12/2008 | Lee | ....................... | H02P 27/047 318/807 |
| 9,673,743 B1 * | 6/2017 | Billson | .................... | H02P 23/26 |
| 10,574,153 B1 * | 2/2020 | Issac | ....................... | H02M 7/219 |
| 2007/0216343 A1 * | 9/2007 | Rozman | ................... | H02P 21/06 318/811 |
| 2015/0180384 A1 * | 6/2015 | An | .......................... | H02M 5/44 318/400.3 |

FOREIGN PATENT DOCUMENTS

CN       206211851 U     5/2017

OTHER PUBLICATIONS

"Three phase sine wave generator" https://microcontrollerslab.com/three-phase-sine-wave-generator/ . Nov. 24, 2021.
"IGBT Overcurrent and Short-Circuit Protection in Industrial Motor Drives", Dara O'Sullivan, Sep. 22, 2017.

* cited by examiner

*Primary Examiner* — Rina I Duda
(74) *Attorney, Agent, or Firm* — Maschoff Brennan

(57) ABSTRACT

Disclosed is an AC motor drive (600) for a three phase, 400 Hz., AC induction motor. The application is a constant speed, constant load application. An AC power source with a wide variation in voltage and frequency is rectified to establish a DC bus. A three phase full wave bridge inverter operates on this source. A cascaded sinusoidal reference signal generator (225) generates three sinusoidal voltages 120° phase shifted from one another. These pure sinusoidal reference help reduce harmonic currents. A high PWM frequency is used to operate the power switches of the bridge to reduce current harmonics. The speed regulator (220) generates an error voltage between a speed command voltage and a feedback of DC voltage that is equivalent to the RMS value of the terminal voltage of the motor for speed regulation. The harmonic content of the DC bus current is extracted to provide short circuit protection.

3 Claims, 9 Drawing Sheets

Practical implementation of the disclosed AC Motor Drive

THREE PHASE AC MOTOR DRIVE

FIELD OF THE INVENTION

This disclosure belongs to the field of power electronics. In particular, it belongs to the field of AC motor drives. More particularly, it belongs to the field of AC induction motor drives with rated frequency of 400 Hz.

BACKGROUND TO THE INVENTION

A majority of motors are designed to operate on a supply voltage with a frequency of 50 Hz or 60 Hz. Some motors, however, are designed to operate at other frequencies, 400 Hz for example. Such motors may require power electronic devices which supply the motor terminals with their rated voltages at 400 Hz.

There are various types of power electronic drives that generate the motor terminal voltages in different ways. One such drive generates what is normally referred to as a pseudo sine wave. Such a device may generate output voltages, the waveforms of each of which is an approximation of a sine wave. Such a waveform is often called a pseudo sine wave and may consist of two or more steps of voltages that are applied to the terminals of the motor. Such pseudo sine wave voltages generate harmonic currents in the AC motor windings which in turn leads to large undesirable iron losses in the motor.

To reduce the undesirable harmonic currents, the number of steps in the voltages may be increased. Still, such waveforms may be referred to as pseudo sine wave as they are not pure sine waves. All such schemes, however, result in some harmonic currents, which is unavoidable.

Alternatively, power electronic devices may use pulse width modulation techniques for producing the motor terminal voltages. Even though this technique is far superior to the pseudo sine wave method, drives using this technique also generate harmonic currents which is undesirable. The harmonic content can, however, be reduced by increasing the frequency of pulse width modulation.

Such problems are further exacerbated by sinusoidal reference sine waves which are produced by digital methods. Such sine waves, also have, however large, a finite number of steps and are not pure sinusoidal wave forms. This also causes the motor terminal voltages to have harmonic currents.

Many known power electronic AC motor drives comprise power electronic devices which are protected by semiconductor fuses which are expensive. The reason for this use of semiconductor fuses is that the AC motor drives are not fully protected against instantaneous over currents such as those caused by output short circuit or ground faults.

Known constant speed power electronic drives are open loop systems and hence may have a high load regulation.

SUMMARY OF THE INVENTION

The present disclosure discloses an AC motor drive configured to avoid or mitigate at least one of the problems in the state of the art AC motor drives.

This summary is provided to introduce a selection of concepts in a simplified format that are further described in the detailed description of the invention. This summary is not intended to identify key or essential inventive concepts of the subject matter, nor is it intended for determining the scope of the invention.

The disclosed AC motor drive comprises a cascaded sinusoidal reference voltage generator. This sinusoidal voltage generator generates three sine wave reference voltages phase shifted by 120° with one another. This avoids or at least mitigates the problem of harmonic currents generated by sine reference voltages which are non-ideal, that is, those generated digitally.

The disclosed AC motor drive comprises a short circuit protection circuit fast enough to protect the power semiconductor devices. The short circuit protection circuit is configured to measure the harmonic content of the DC current in the DC link of the AC motor drive. The harmonic content is analysed, by an analog circuit and used to generate a trip signal in such a way that, in case of an instantaneous over current, the power devices are turned off safely by making semiconductor fuses unnecessary. This may further have the advantage of reducing the overall lifetime cost of the disclosed AC motor drive.

The disclosed AC motor drive comprises a terminal voltage feedback circuit which is configured to feed back a DC voltage equivalent of the RMS value of the terminal voltages. This feedback enables providing a higher terminal voltage which hence allows a higher current to flow through the windings of the AC motor thereby improving the load and line regulations.

It has to be noted here that the disclosed AC motor drive is oriented towards driving a motor of fan or an axial blower. This load has the following characteristics. The load on the motor is substantially constant at rated speed. It also operates only at a fixed speed which is the rated speed of the motor. Further, the motor has a rated frequency of 400 Hz. In such motors, it is preferred to have as high a PWM frequency as feasible without compromising temperature rise due to power loss in the power devices. Still further, voltage supplied to the input of the AC motor drive disclosed herein is unregulated and varies over a large range.

Thus, disclosed is a power electronic, substantially constant speed, solid state, three phase, 400 Hz AC motor drive for generating three phase AC voltages for driving a three phase, 400 Hz., AC induction motor, the drive comprising an error amplifier for generating an error signal between a speed command and a dc voltage equivalent of the RMS voltage of one phase of the three phase AC voltages, a sinusoidal reference voltage generator for generating three sinusoidal reference voltages 120° phase shifted from one another; and an RMS value generator circuit for generating a dc voltage equivalent of the RMS voltage of one phase of the three phase AC voltages.

To further clarify advantages and features of the present invention, a more particular description of the invention will be rendered by reference to specific embodiments thereof, which is illustrated in the appended figures. It is to be appreciated that these figures depict only typical embodiments of the invention and are therefore not to be considered limiting of its scope. The invention will be described and explained with additional specificity and detail with the accompanying figures.

BRIEF DESCRIPTION OF THE FIGURES

The invention will be described and explained with additional specificity and detail with the accompanying figures in which.

Figure 1:
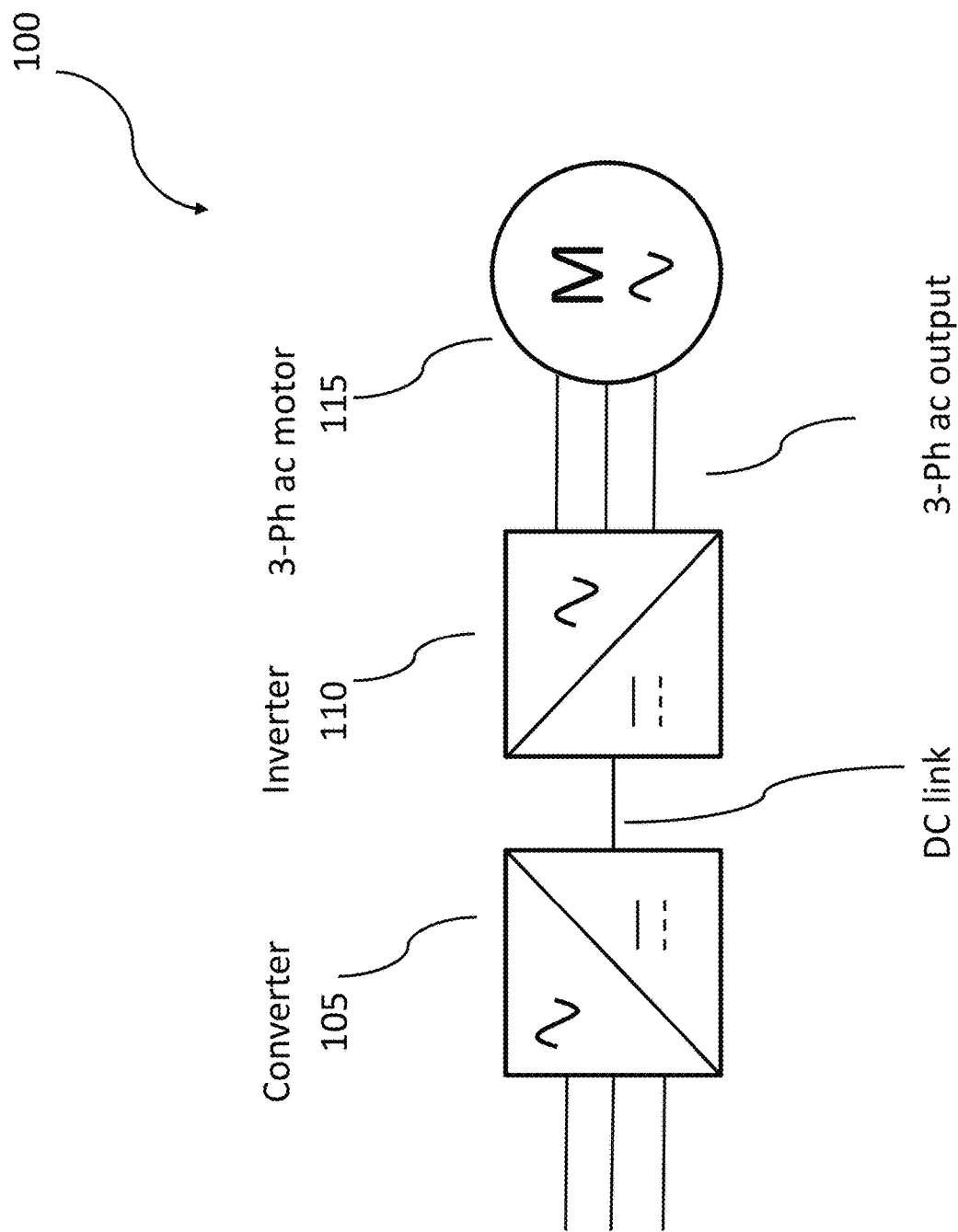
FIG. 1 is a block diagram of a generic, state of the art AC motor drive.

Further, skilled artisans will appreciate that elements in the figures are illustrated for simplicity and may not have been necessarily drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having benefit of the description herein.

DESCRIPTION OF THE INVENTION

For the purpose of promoting an understanding of the principles of the invention, reference will now be made to the embodiment illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying figures.

While specific language has been used to describe the disclosure, any limitations arising on account of the same are not intended. As would be apparent to a person skilled in the art, various working modifications may be made to the method in order to implement the inventive concept as taught herein.

FIG. 1 shows a block diagram of a generic AC motor drive 100. Rectifier 105 converts the AC input supply into a DC voltage and is filtered. The DC voltage is supplied to an inverter 110 for converting the DC voltage into a three phase AC voltage for supplying to an AC motor 115. The control circuit of such an AC motor drive is configured to receive a speed command signal and drive the AC motor at the speed commanded by it. For example, the speed command signal could be a DC voltage signal of 0 to +10 V for a unidirectional drive and 0 to ±10 V for a bidirectional drive.

Even though such an AC motor drive is normally used for the speed control of an AC motor 115, in other words, as a variable speed drive, the AC motor drive disclosed herein is used as a substantially constant speed AC motor drive. This is because the mains AC supply voltage input to the drive and its frequency vary considerably in certain applications. The purpose is to operate the motor at a substantially constant speed irrespective of the wide fluctuations in the input supply voltage—both in frequency and voltage.

Figure 2:
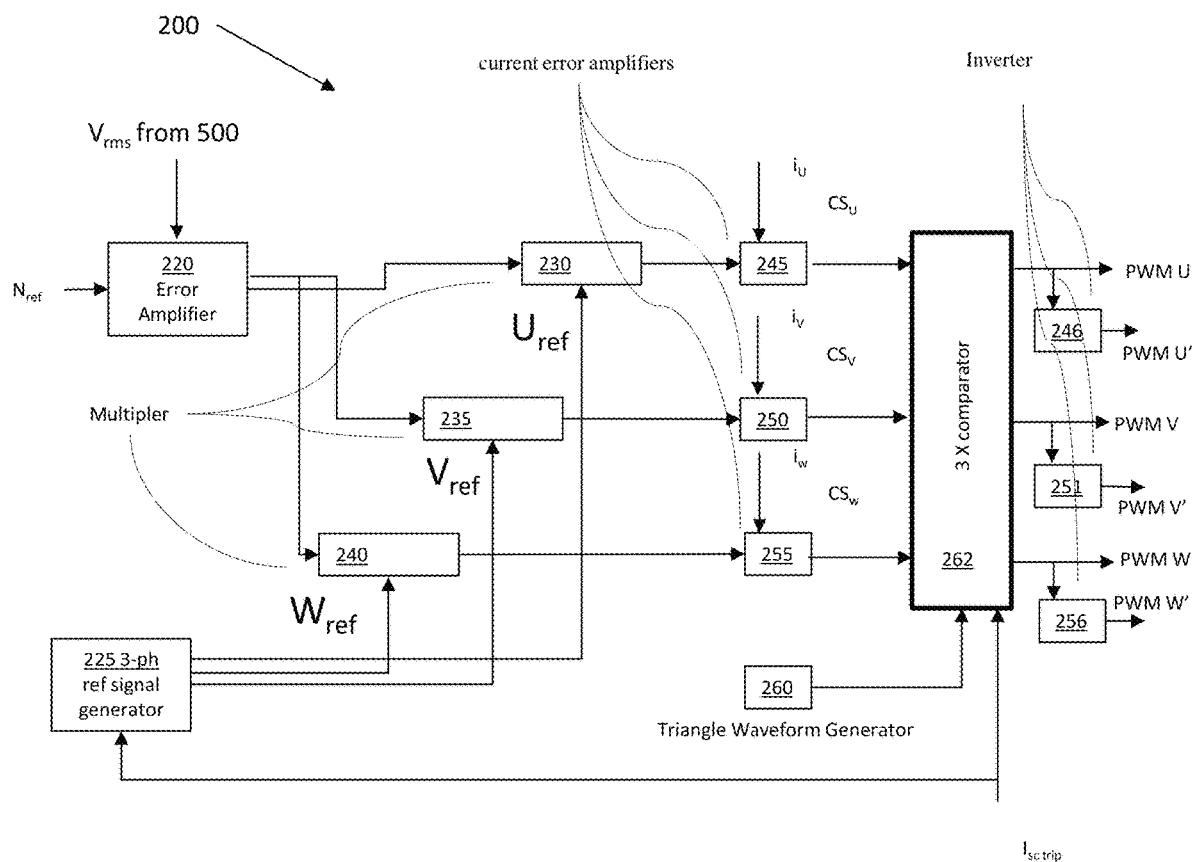
FIG. 2 is a block diagram of the control circuit of the disclosed AC motor drive in accordance with an embodiment of the present disclosure.

FIG. 2 is a block diagram of the control circuit 200 of the AC motor drive in accordance with an embodiment of the present disclosure. The functioning of the control circuit 200 of this embodiment of the disclosed AC motor drive will now be described in detail. At the first stage of the control circuit is a speed error amplifier 220, in a known way. It may be an operational amplifier (opamp) based error amplifier of the PI (proportional—integral) controller type. The speed reference input $N_{ref}$ to this is a constant DC voltage, 10 V for example. This reference voltage is compared with a feedback voltage $V_{rms}$. In the disclosed device the feedback is a DC voltage which is proportional to the RMS value of the voltage between two terminals of the motor being driven, the U and V terminals, for example. The method of generating the RMS value will be described in detail further below with reference to FIG. 5. The output of the error amplifier is used to regulate the output voltage of the AC motor drive.

The output of the speed error amplifier 220 is fed to one of the input terminals of each of the three analog multipliers 230, 235, 240. The other terminal of each of these multipliers is fed with a reference sinusoidal voltage each, generated by the reference three phase reference signal generator 225. These three sinusoidal voltages are 120° phase shifted from each other and have a frequency of 400 Hz, in one exemplary embodiment. These three waveforms, $U_{ref}$, $V_{ref}$ and $W_{ref}$ are generated by a three phase reference signal generator 225. The details of this three phase reference signal generator 225 will be described in detail further below with reference to FIG. 3 and FIG. 4.

The outputs of these three multipliers 230, 235, and 240 are the three phase current references. These three phase current references are compared with the measured values of the three phase currents $i_u$, $i_v$, and $i_w$ flowing into the motor windings, in a known way, in three current error amplifiers 245, 250, and 255. The current error amplifiers are also opamp based error amplifiers with PI characteristics, for example. The current sensors (no shown) used for measuring the motor input currents may be of the Hall effect based sensors known in the field. The outputs $CS_U$, $CS_V$, and $CS_W$, of the three current error amplifiers 245, 250, and 255, respectively are the control signals used for generating the PWM signals for driving the power devices of the power circuit for generating the output voltages of the disclosed AC motor drive, Silicon Carbide MOSFETS are used as the power devices in one embodiment of the disclosed AC motor drive. Even though it is mentioned that the speed and current error amplifiers may be of PI type, it is also possible to use PID (proportional-integral-differential) type of amplifiers with advantage.

The control signals $CS_U$, $CS_V$, and $CS^W$, are compared with a triangular waveform with a frequency of the predetermined PWM frequency in three comparators shown as a single block 262 in FIG. 2. Thus, this block generates the PWM pulses PWM U, PWM V, PWM W, for one set of the power devices of the full bridge, say the top half of the bridge. Their logic complements PWM U', PWM V', PWM W' are generated by the inverter blocks 246, 251, and 256, respectively for driving the other set of power devices, say the bottom half of the bridge. The dead time (for avoiding shoot through faults) between each PWM pulse, and its complement is generated, in a known way.

Figure 3:
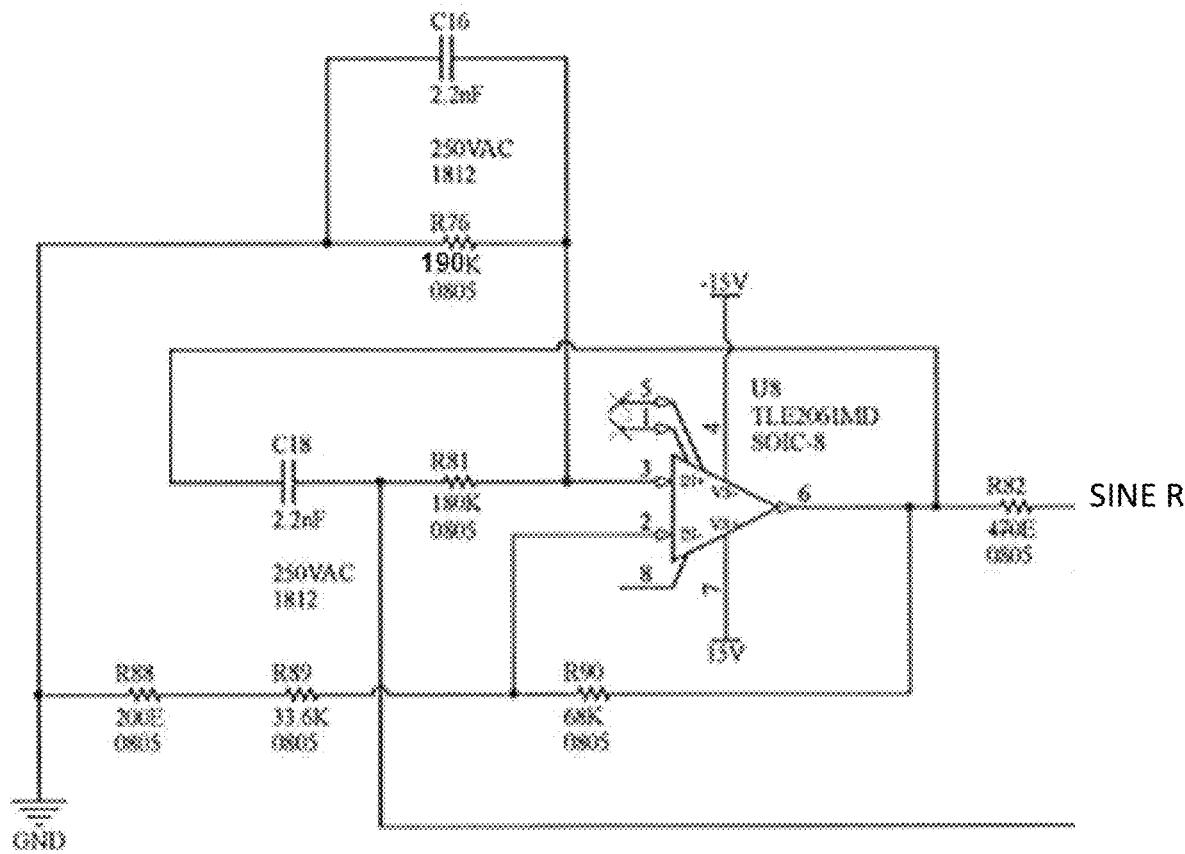
FIG. 3 shows the circuit diagram of a sine wave generator used for generating the reference sine wave signal of u phase.

FIG. 3 shows an opamp based self-oscillating sine wave generator 225 configured for generating a sine wave of a frequency of approximately 400 Hz. This circuit generates bipolar sine wave signal of peak-to-peak voltage of approximately 20 V. This may be treated as the representation of the U phase sine wave.

Figure 4A:
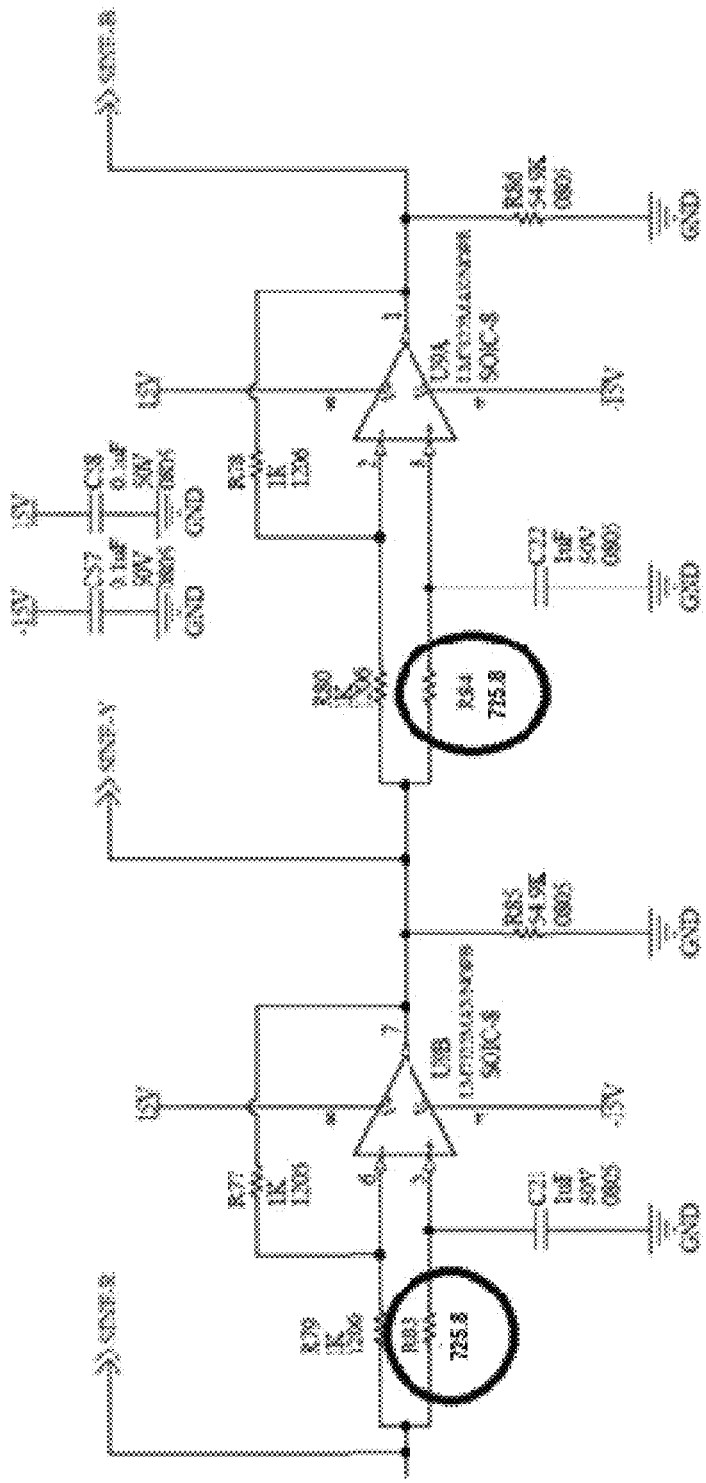
FIG. 4A shows the circuit diagram of cascaded phase shifting amplifiers for generating the v and w phase reference sine wave signals.

FIG. 4 shows the circuit diagram of two cascaded phase shifting amplifiers for generating the reference sine wave signals for the V and W phases. When the circuit shown in FIG. 3 and the circuit shown in FIG. 4 are cascaded the circuit provides the U, V, and W phase reference signals, phase shifted by 120° with each other. These reference signals are the reference signals referred to in the block diagram of FIG. 2, issuing out of the three phase sine wave reference signal generator 225.

The function of circuits of FIG. 3 and FIG. 4 are determined by the following exemplary equations. The output frequency of the three-phase reference sine wave signal generator of FIG. 3 is determined by the equations:

$$f = \frac{1}{2 \times \pi \times R \times C}$$

Where R=R76=R81
C=C16=C18
For the circuit in FIG. 3, the frequency is

1/(2×π×190.47×10³×2.2×10⁻⁹)=380 Hz

To create a phase shift of 120° between sine references

Phase Shift $\Phi = 2 \arctan \times 2 \times \pi \times F \times R \times C$

Where Φ=120°
F=380 Hz
R=R83=R84
C=C21=C22
If C21=C22=1 µf
Then the value or R=R83=R84

=tan(Φ/2)/(2×π×f×C)

=tan(60)/(2×3.14×380×10⁻⁶)

=725.85Ω

In operation, the start sequence of disclosed AC motor drive may be as follows. The power input to the device, say 250 V DC is turned on through a circuit breaker, for example. This voltage is also used to generate the control supply voltages to the control circuits, for example ±15 V, for example. The three phase out terminals are permanently connected to the AC motor that the disclosed AC motor drive is intended drive. Once the control power supplies are established and stabilised, the sinusoidal reference voltages start and the three reference signals start ramping up in amplitude but at the frequency to which it has been configured, that is, 400 Hz. For example.

Figure 4B:
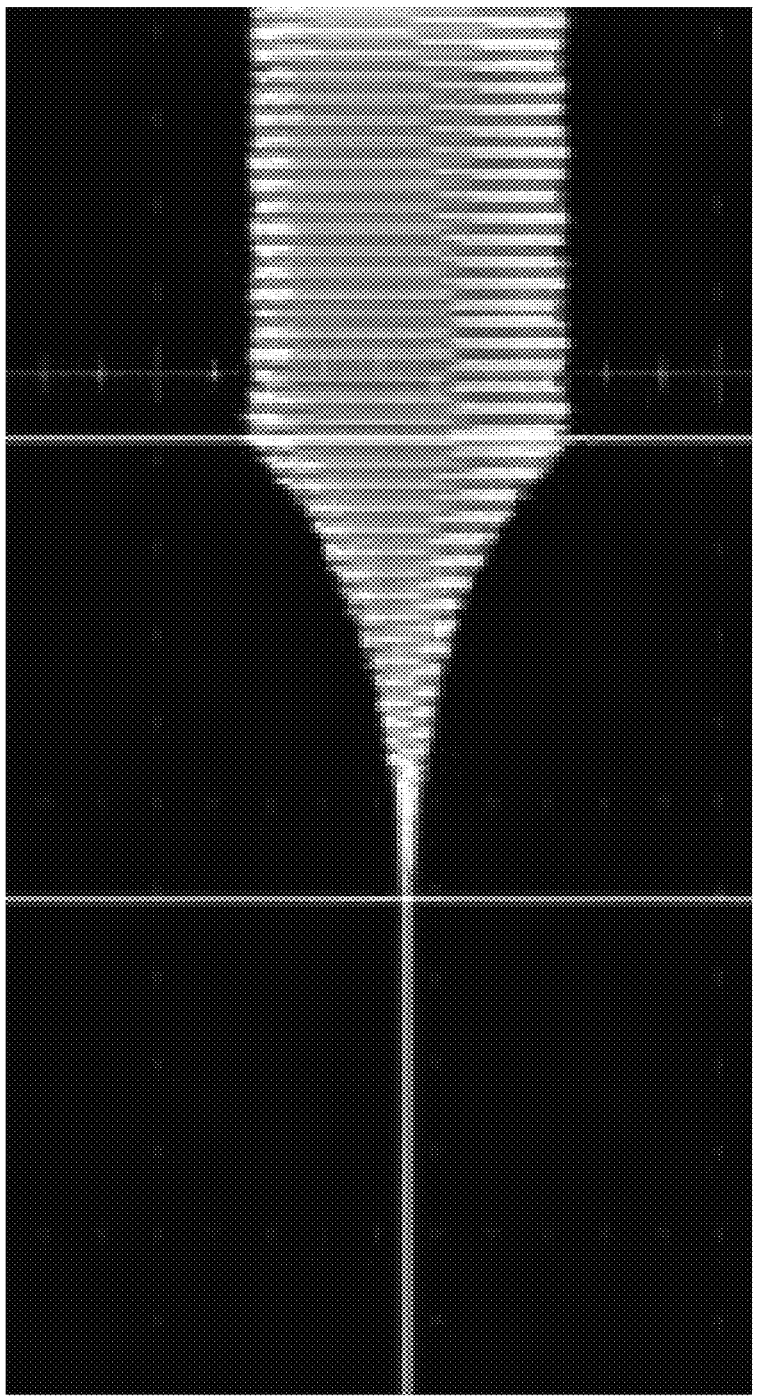
FIG. 4B shows a sine wave reference signal ramping up.

The speed command signal is a constant DC voltage, 10 V, for example. Thus, the supply voltages to the motor terminal ramps up from 0 V to the rated voltage. This may be set to be achieved in 250 ms, for example. This ramping up function is shown in FIG. 4B. Unlike many AC motor drives, which function on the principle of V/F control during start up, the disclosed AC motor drive functions on the principle of constant frequency with the voltage ramping up. V/F in this context means that the ratio of the voltage and frequency at the terminals of the motor remains a constant, up to the rated voltage and frequency. That is, if a motor is rated at 440 V, 50 Hz, at half the rated speed, it will be driven with 220 V and 25 Hz, for example.

Figure 5:
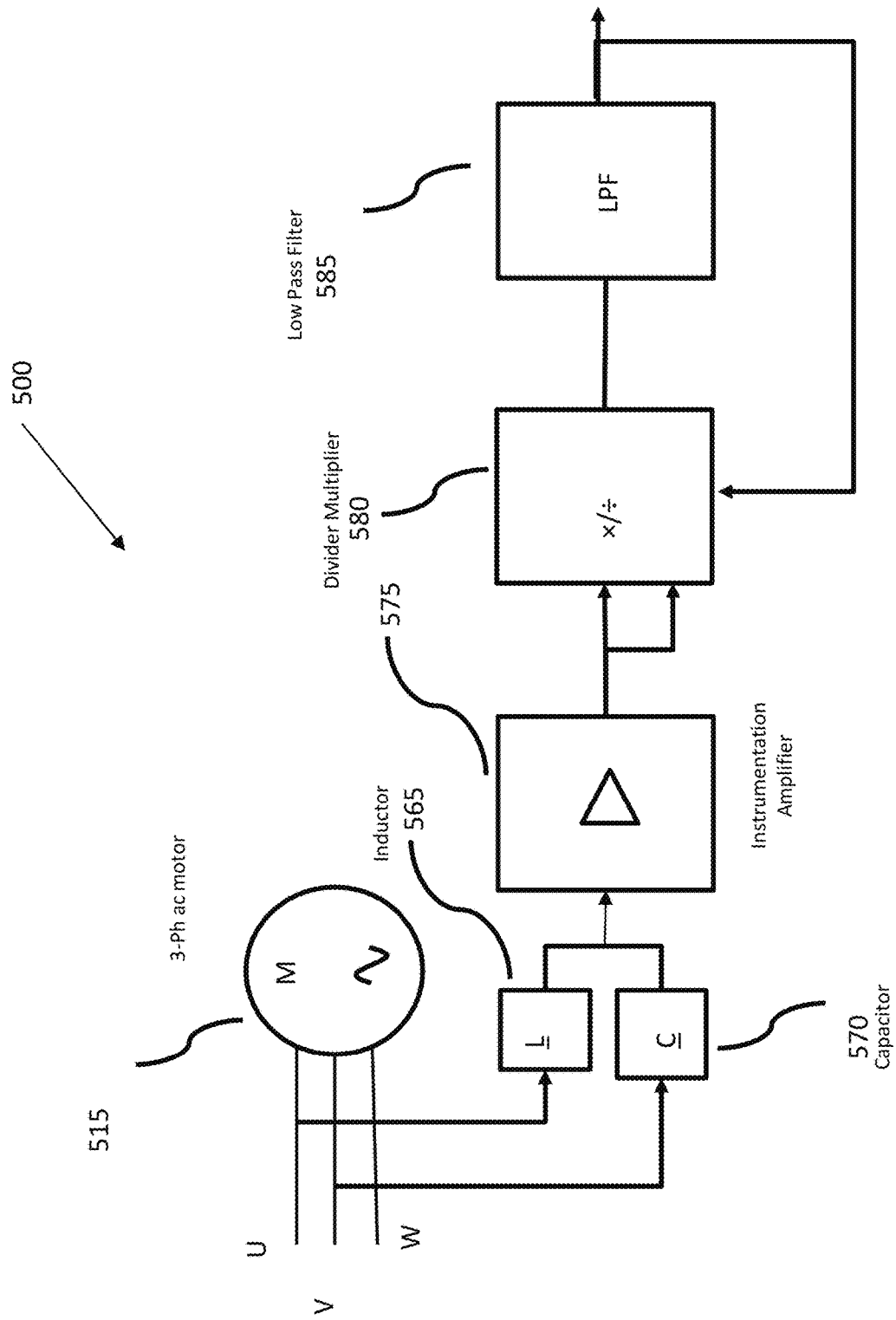
FIG. 5 shows a block diagram of the circuit for generating the DC voltage equivalent of the RMS voltage of the terminals of the motor as a feedback signal.

The circuit for generating the feedback voltage will be described in detail now with reference to FIG. 5. The terminal voltage between U and V phases are fed to the two inputs of a multiplier 580 through a divider formed with an inductor 565 and a capacitor 570, through an instrumentation amplifier 575 with high input impedance. The cut off frequency for this dual pole filter is selected to be close to twice the fundamental frequency of 400 Hz. That means the cut off frequency of this is close to 800 Hz. This is attenuated with an instrumentation amplifier 575 with a high input impedance −2 MΩ, for example. This provides a high impedance between the power line voltage and the electronic ground. Connecting the same attenuated signal to the two multiplying inputs of the multiplier has the effect that the attenuated version of the U-V phase-to-phase voltage is multiplied by itself, giving rise to the square of that voltage at the output of the multiplier 580. The output of the multiplier 580 is fed to a low pass filter 585. The output of the low pass filter 585 is fed back to the divider input terminal of the multiplier 580. The output of this circuit is the RMS value of the U-V phase-to-phase voltage.

The equations governing this are well known and are as follows.

$$V_{out} = \left[ \frac{V_{in}^2}{V_{out}} \right]$$

$$\left[ \frac{V_{in}^2}{V_{out}} \right] = \frac{\pm V_{in}^2}{V_{out}}$$

$$V_{out}^2 = V_{in}^2$$

$$V_{out} = \sqrt{V_{in}^2}$$

Another advantageous aspect of the disclosed AC motor drive is the instantaneous overcurrent protection circuit for protecting the power devices against short circuits, for example. This protection is achieved by measuring the DC link current and extracting its harmonic content. The following equations determine the harmonic content.

$$I_d = (\sqrt{2}V_O \times \sqrt{I_O}/V_d \times \cos \omega t \times \cos(\omega t - \emptyset)) + (\cos(\omega t - 120) \times \cos(\omega t - 120 - \emptyset)) + (\cos(\omega t + 120) \times \cos(\omega t + 120 - \emptyset))]$$  Equation 1

$$I_d = (2V_O \times I_O/V_d \times \cos(\omega t + \omega t - \emptyset)) + \cos(\omega t - \omega t + \emptyset) + \cos(\omega t - 120 + \omega t - 120 - \emptyset) + \cos(\omega t - 120 - \omega t + 120 + \emptyset) + \cos(\omega t + 120 + \omega t + 120 - \emptyset) + \cos(\omega t + 120 - \omega t - 120 + \emptyset)]/2$$  Equation 2

$$I_d = \mu V_O \times I_O/V_d] \times [\cos(2\omega t - \emptyset) + 3\cos(\emptyset) + \cos(2\omega t - 240 - \emptyset) + \cos(2\omega t + 240 - \emptyset)]/2$$  Equation 3

$$I_d = [V_O \times I_O/V_d] \times [\cos(2\omega t - \emptyset) + 3\cos(\emptyset) + 2[\cos((2\omega t + 2\omega t + 240 - 240 - \emptyset - \emptyset)/2) \times \cos((2\omega t - 240 - \emptyset - 2\omega t - 240 + \emptyset)/2)]$$  Equation 4

$$I_d = [V_O \times I_O/V_d] \times [\cos(2\omega t - \emptyset) + 3\cos(\emptyset) + 2[\cos(2\omega t - \emptyset) \times \cos(-480)]$$  Equation 5

$$I_d = [V_O \times I_O/V_d] \times [\cos(2\omega t - \emptyset) + 3\cos(\emptyset) + 2[\cos(2\omega t - \emptyset) \times -\tfrac{1}{2})]$$  Equation 6

$$I_d = [V_O \times I_O/V_d] \times [\cos(2\omega t - \emptyset) + 3\cos(\emptyset) - \cos(2\omega t - \emptyset)]$$  Equation 7

$$I_d = [VO \times IO/Vd] \times [3\cos(\emptyset)]$$  Equation 8

The inventor has realised that if a signal equivalent to the term [3 cos(Ø)] of Equation 8 can be extracted, it can be used to sense instantaneous overcurrent and hence trip the power circuit instantaneously to protect the power devices.

Figure 6:
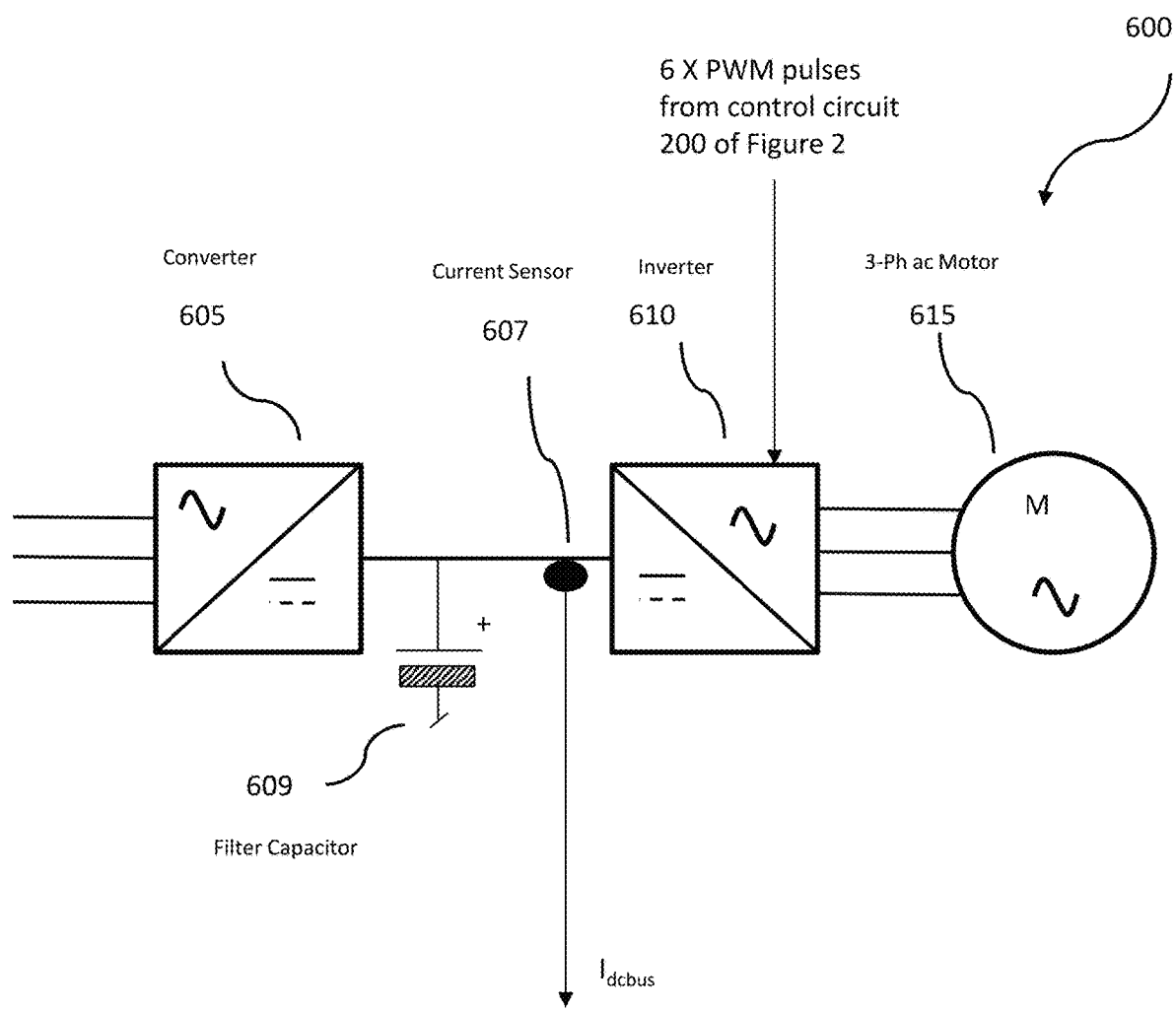
FIG. 6 shows a block diagram of the scheme for sensing current for instantaneous overcurrent protection circuit according to one embodiment of the present disclosure.

This will be described in detail with reference to FIG. 6 and FIG. 7. Figure shows a current sensor 607. Current sensor 607 is a non-contact type current sensor based on the phenomenon known as Hall effect, for example. The current sensor is so positioned as to measure the current from the filter capacitor 609 to the inverter 610. A current sensor with a high bandwidth may be used advantageously. A current sensor with a bandwidth of 250 kHz may be used with advantage. The output of this current sensor is designated as $I_{dcbus}$ in FIG. 6.

Figure 7:
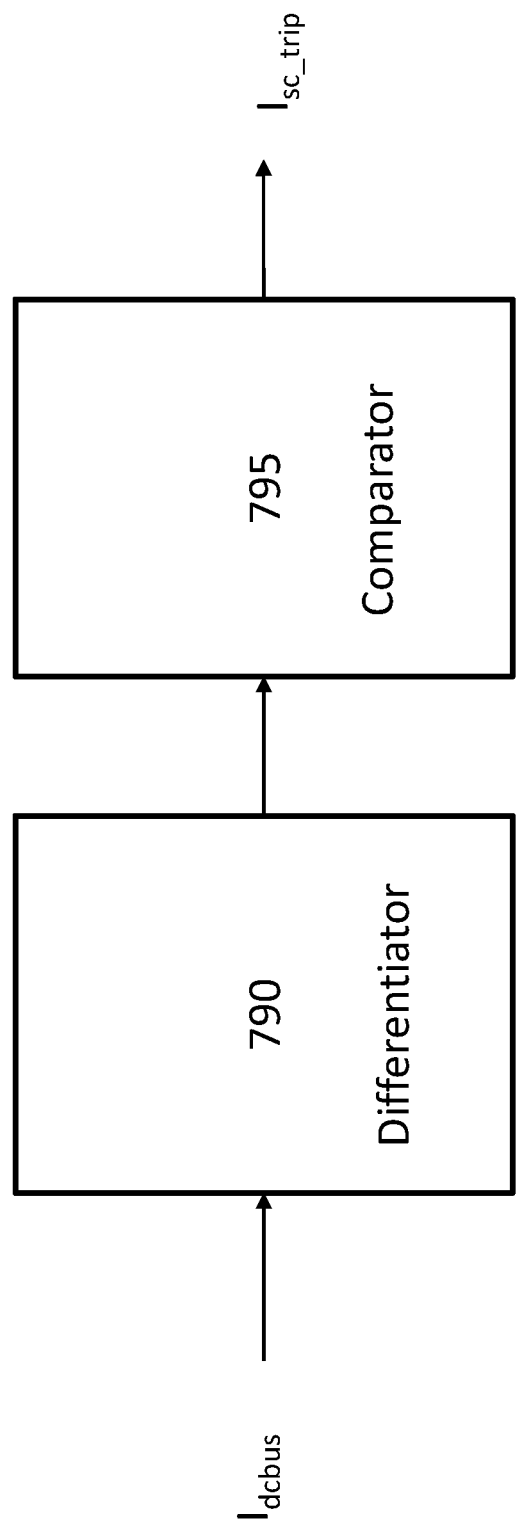
FIG. 7 shows a block diagram of the instantaneous overcurrent circuit according one embodiment of the present disclosure.

FIG. 7 shows a block diagram of circuit used for processing the current $I_{dcbus}$ to derive the pulse blocking signal. The signal, $I_{dcbus}$, is passed through a differentiator 790. The output of this differentiator is fed to a comparator 795. In this comparator 795, the output of the differentiator 790 is compared with a predetermined reference voltage. Whenever the output of the differentiator 790 exceeds the predetermined reference voltage, the output of the comparator 795 changes state. In one implementation the output of the differentiator 790 is normally at a logic zero, 0 V, for example. If, due to a short circuit or any other forms of fault in the power section of the disclosed DC motor drive, the output of the comparator 795 changes to a logic 1, 15 volts for example. The output of the comparator $I_{sc\_trip}$ is connected to an input of the comparator 262 of FIG. 2. The comparator 262 of FIG. 2 is configured to instantaneously stop producing the PWM pulses when a logic 1 is detected at its input, thus blocking the production of the PWM pulses and driving the power devices to avoid an instantaneous overcurrent going through the power devices and thereby destroying the power devices.

Additionally, the output $I_{sc\_trip}$ of the comparator 795 is also connected to the sinusoidal reference voltage generator 225 and all the outputs of the sinusoidal reference voltage generator 225 is clamped to 0 V when the $I_{sc\_trip}$ attains a logic 1 state. This has the effect of turning the PWM pulses PWM U, PWM V, and PWM W, and their logical complements PWM U', PWM V', and PWM W' assume state that it is the same as the off signal to the power devices. This is used a redundant measure for protecting the power devices against instantaneous overcurrents.

Processing of $I_{dcbus}$ as explained above with reference to FIG. 7 extracts the 3 cos(Ø) component of the signal $I_{dcbus}$.

AC motor drives based on the principles disclosed in this disclosure may have the advantage that they are compact and can be fitted on to the body of the AC motor being driven by them. Such an AC motor drive may have the advantage that no semiconductor fuses are needed to protect the power devices used. Such AC motor drive may also have the advantage that the switchgear needed to control their operation is minimised. Still further, the pure sinusoidal reference voltage and high PWM frequency reduces the harmonic currents and may reduce the losses in the motor. It may also reduce the stresses on the insulation of the motor and contribute to the longer life of the motor being driven by it. Still further, with all the heretofore listed advantages, the overall cost of ownership of the equipment may be advantageously reduced.

Figure 8:
FIG. 8 shows a practical implementation of an AC motor drive based on the principles disclosed in this disclosure.

FIG. 8 shows a practical AC motor drive implemented according to the teachings of this disclosure. This is a single PCB version of the drive, which is mounted directly the body of the motor, just inside its end cover, for example. It operates on a nominal input supply voltage of 140 V phase-to-phase, 50/60 Hz AC three phase input. It is configured to drive a 2.5 kW, 120 V AC, 400 Hz rated motor driving a fan.

However, it has to be noted that the disclosed AC motor drive is configured for operation with low harmonic currents as described heretofore. However, if the input supply voltage varies to voltages below the rated tolerance voltage, say −5% (minus 5%) also, the drive continues to function with higher harmonic content than when the rated supply voltage is provided. However, because of the RMS voltage feedback, the disclosed AC drive operates such that the PWM signal saturates to continue to drive the motor, albeit with a higher harmonic content at least down to 25% below rated voltage. It may continue to work with the supply voltage down to 40% below rated voltage.

The figures and the foregoing description give examples of embodiments.

Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A solid state, power electronic, substantially constant speed, three phase, AC motor drive for generating three phase AC voltages for driving a three phase AC induction motor, the drive comprising:
   an error amplifier for generating an error signal between
      a speed command and a dc voltage equivalent of RMS voltage of one phase of the three phase AC voltage output of the drive, an RMS value being generated by an RMS value generator circuit; and a sinusoidal reference voltage generator for generating three sinusoidal reference voltages, 120° phase shifted from one another.

2. The AC motor drive as claimed in claim 1 comprising an instantaneous over current trip circuit comprising:

a current sensor configured for generating a signal (Idcbus) proportional to a current from a filter capacitor to an inverter, a differentiator for differentiating the signal (Idcbus) for obtaining a signal proportional to the harmonic content of the signal (Idcbus), a comparator for comparing the signal proportional to the harmonic content of the signal (Idcbus) for generating a logic signal (Isc_trip) when the signal proportional to the harmonic content exceeds a predetermined value, and using the logic signal (Isc_trip) to block the generation of PWM pulses in a comparator configured for generating the PWM pulses.

3. The AC motor drive as claimed in claim 2 wherein the sinusoidal reference voltage generator is configured to bring its outputs to 0 V when the logic signal (Isc_trip) is fed to the sinusoidal reference voltage generator.

* * * * *